May 12, 1964     R. C. HEFFERNAN ETAL     3,132,513
TEMPERATURE COMPENSATING MECHANISM FOR GAS METERS
Filed Feb. 28, 1961     2 Sheets-Sheet 1

INVENTORS
ROBERT C. HEFFERNAN
WALTER H. SIEGER
BY
ATTORNEY

United States Patent Office 3,132,513
Patented May 12, 1964

3,132,513
TEMPERATURE COMPENSATING MECHANISM FOR GAS METERS
Robert C. Heffernan, Northport, N.Y., and Walter H. Sieger, Pine Orchard, Conn., assignors to Neptune Meter Co., New York, N.Y., a corporation of New Jersey
Filed Feb. 28, 1961, Ser. No. 92,411
12 Claims. (Cl. 73—281)

This invention relates to gas meters. More particularly, the invention relates to gas meters which are compensated for temperature changes which cause expansion and contraction in the volume of gas passing through the meter.

The utility which distributes gas to consumers receives gas from the producer at a pre-selected base temperature, which is ordinarily 60° F. This insures a constant number of thermal units in each unit volume of gas so delivered. Since the volume of a given mass of gas, at a constant pressure, increases for a given rise in temperature, and decreases for a given fall by a definite fraction of its volume, it is impossible to deliver a constant number of thermal units to the consumer in varying temperatures unless the gas meter through which the gas is delivered is compensated for the variations in temperature to which it may be subjected. Accordingly, it has been suggested to provide temperature compensated gas meters which deliver a greater volume of gas when the temperature is high and a smaller volume when the temperature is low. This results in the delivery of a constant measure of thermal units without regard to the variation in temperature and the consequent difference in the volume of the gas.

Since displacement of a gas meter is proportional to the length of its tangent, it is possible to change the effective length of the tangent with a temperature-responsive element in order to correct the displacement for the operation of Charles' law. The amount of correction necessary is about 1% for every 5° F. change in temperature. If a temperature compensated tangent is used, the meter will usually be adjusted from a 60° F. base. For a temperature in excess of 60° F., the effective length of the tangent must be increased somewhat over the standard length, and when the temperature is below 60° F. the effective length of the tangent must be decreased accordingly.

Basically, a gas meter (uncompensated for temperature correction) is constructed in such manner that it is strictly a volume measuring instrument. As such it is extremely accurate, registering within ¼ of one percent of the true number of cubic feet of gas passing through it. This accuracy is achieved by adjustments which are made by a skilled technician who compares the registered number of cubic feet passing through the meter with a precisely measured volume that has been delivered to the meter. Inaccuracies in the meter are removed by making adjustments on the tangent until the registered amount shown on the meter agrees with the known quantity within the above mentioned ¼ of one percent.

However, a utility that dispenses gas to consumers, does not buy its gas strictly on a volumetric basis. The value of the gas depends on its ability to produce heat. This, in turn, is dependent on the number of therms in the unit of gas purchased. The utility pays for its gas in terms of standard cubic feet at a given temperature and pressure so that in effect the utility buys B.t.u.'s instead of cubic feet of gas. The measuring device used by the utility in its purchase of gas is compensated both for pressure and temperature. Generally 60° F. is used as a base temperature. The pressure may vary with conditions but does not become a problem when the utility sells its gas as it is much more controllable than temperature.

The object of this invention is to convert the conventional gas meter, that can measure only volume, into a meter that can truly measure B.t.u.'s. This, therefore, makes it possible for the utility to sell the same quantity of value that it buys.

In essence, this invention makes the tangent adjustment automatically variable in response to variable temperatures in a linear fashion. The net effect being that a standard or basic cubic foot of gas at 60° F. which, according to Charles' law, will have reduced its volume approximately 12% at 0° F., will be compensated for in the registration of a meter equipped with this invention so that when a cubic foot of gas at 0° F. has passed through the meter, it will be registered as 112% of a cubic foot. An uncompensated meter would, under similar conditions, register this same amount of gas as one foot thereby causing the utility to lose 12% of its revenue in this particular case.

The use of temperature-responsive bi-metal elements for modifying the effective length of the tangent in response to temperature changes is common in the art. These prior devices have, however, not always been completely satisfactory due, in large measure, to complexity of construction and the difficulty with which meters so modified are adjusted.

It is, therefore, the primary objective of this invention to provide a temperature compensating mechanism for gas meters which is simple in construction and certain and positive in its operation. Moreover, it is the purpose hereof to produce a meter on which compensated and uncompensated performance can be checked quickly and accurately on successive proofs in any proving room.

It is a further object of this invention to provide compensating mechanism for gas meters such that the meter may be employed either as a temperature compensated meter or as an uncompensated meter at the option of the utility.

It is a further object of this invention to provide a gas meter which may be installed to operate as an uncompensated meter, but which can be quickly and easily converted in the field to operate as a compensated meter, and vice versa.

Finally, it is an important object of this invention to provide a compensating device for gas meters which embodies improved mechanical features which result in an improved and more accurate operation.

To the end of attaining these and other objectives, the invention herein contemplates a compensated tangent mechanism in which the distance between the tangent wrist assembly and the crank shaft is increased or decreased in response to temperature changes by means of temperature-responsive bi-metal elements, and in which said distance can be releasably fixed at a predetermined base adjustment such that the bi-metal elements are rendered inoperative to modify the distance between the tangent wrist assembly and the crank shaft.

These and other objects and advantages will appear as the further description of the invention is read in light of the drawings, in which like reference numerals indicate like parts, and in which.

Figure 1:
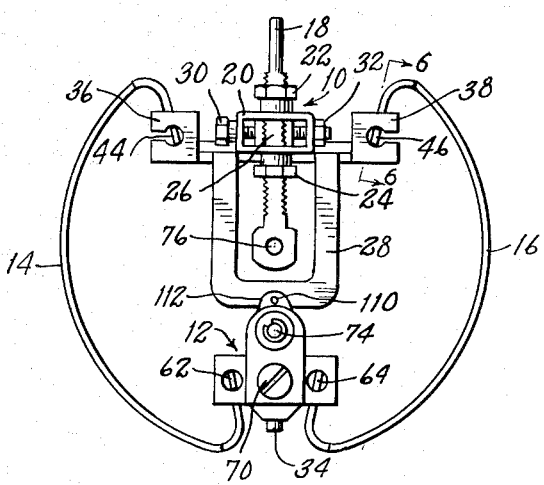
FIG. 1 is a plan view of the compensated tangent mechanism.

By reference to FIG. 1, it can be seen that the compensating device consists broadly of a tangent assembly 10 connected to a tangent wrist assembly 12 by means of a pair of arcuate bi-metallic arms 14 and 16. The bi-metallic arms are thermo-responsive members consisting of bonded strips of metal having, respectively, a low and high co-efficient of expansion. A bi-metal suitable for the purpose is manufacture by the Metals and Controls Division of Texas Instruments incorporated under the trade name of "Truflex."

The tangent assembly 10 consists of a tangent arm 18 which extends through a crosshead 20 in which it is adjustable in an axial direction. The tangent arm is threaded to receive clamping nuts 22 and 24 which can be screwed into contact with the opposite faces of the crosshead 20 to hold the arm in adjusted position.

The tangent assembly also includes an adjustment block 26 which is fixed to a support in the form of a mounting yoke 28. An adjusting screw 30 is threaded through the adjustment block 26 and through the opposite side walls of the crosshead 20 such that turning of the screw will move the crosshead 20 and the tangent arm 18 in a lateral direction. A lock nut 32 on the end of the adjusting screw 30 can be screwed into engagement with the crosshead 20 to maintain the tangent arm in laterally adjusted position.

Figure 5:
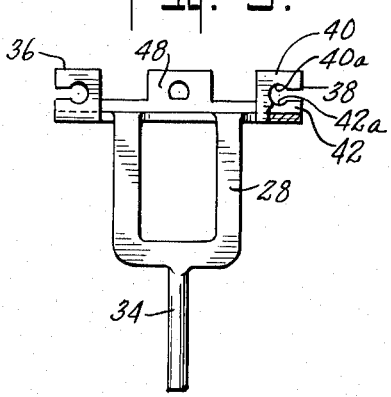
FIG. 5 is a plan view of a mounting yoke.

The mounting yoke 28 is formed with a bearing pin 34 on which the tangent wrist assembly 12 is mounted and on which the assembly can slide as the bi-metal arms 14 and 16 expand and contract. The mounting yoke 28 has a pair of lateral extensions 36 and 38 constituting the anchors for one end of the bi-metal arms 14 and 16. Each extension (FIGS. 5 and 6) consists of a pair of spaced ears 40 and 42 formed with registering seats 40a and 42a for laterally extending lugs 44 and 46 (FIG. 1) formed at the end of the bi-metal arms. The ears are slotted such that the lugs 44 and 46 can be passed therethrough and into their seats. The yoke 28 has a forwardly projecting flange 48 (FIG. 5) to which the adjustment block 26 is fixed.

Figure 2:
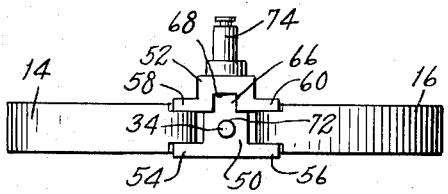
FIG. 2 is an end elevational view taken from the outer end of the tangent wrist assembly.

As best seen in FIG. 2, the tangent wrist assembly consists of a base member 50 and a cap member 52 which are separable. The base member 50 has a pair of laterally extending flanges 54 and 56 which are adapted to cooperate with similar laterally extending flanges 58 and 60 formed on the cap member 52 to form a seat for the opposite end of the bi-metal arms 14 and 16. Both sets of flanges are apertured to form seats for laterally extending lugs 62 and 64 at the opposite end of the bi-metal arms 14 and 16. By reference to FIG. 2, it can be seen that the base member 50 has an axial tongue 66 formed in and extending upwardly from its upper face. This tongue is adapted to fit into an axial groove 68 formed in the bottom face of the cap member 52. The base member and the cap member when assembled are held together by a screw 70 which extends through the cap member 52 and into the base member 50. The base member 50 has an axial bore 72 adapted to receive the bearing pin 34 of the mounting yoke 28. The cap member 52 has fixed therein a wrist pin 74. The base and cap members of the tangent wrist assembly are preferably cast, or molded, nylon elements.

Figure 6:
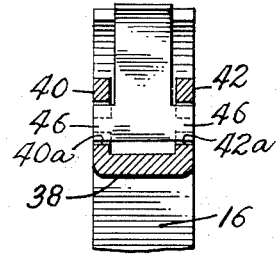
FIG. 6 is an enlarged side sectional view on line 6—6 of FIG. 1.

From the foregoing description, it can be seen that as the bi-metal arms 14 and 16 expand and contract under the influence of temperature changes, the tangent wrist assembly 12 will slide along the mounting yoke bearing pin 34 and the distance between the wrist pin 74 and a crank bearing 76 in the end of the tangent arm will either increase or decrease depending on whether the bi-metal arms contract or expand. It should be noted that as the arms 14 and 16 expand, they move the wrist assembly along the bearing pin 34 in a straight line. This is a very desirable operation because it minimizes timing changes which may result from unusual bind which may result when the wrist assembly is moved in an arc. Furthermore, the unidirectional bend of the arms 14 and 16 results in the most linear rate of deflection per unit of temperature change. It should be noted, moreover, that both ends of the bi-metal arms 14 and 16 are freely pivoted. This is due to the fact that the lugs 44, 46, 62 and 64 engage their respective seats with some tolerance, as shown in FIG. 6. The fact that the arms have freedom of rotative movement at each end contributes greatly to the intended linear performance of the bi-metal elements.

Figure 3:
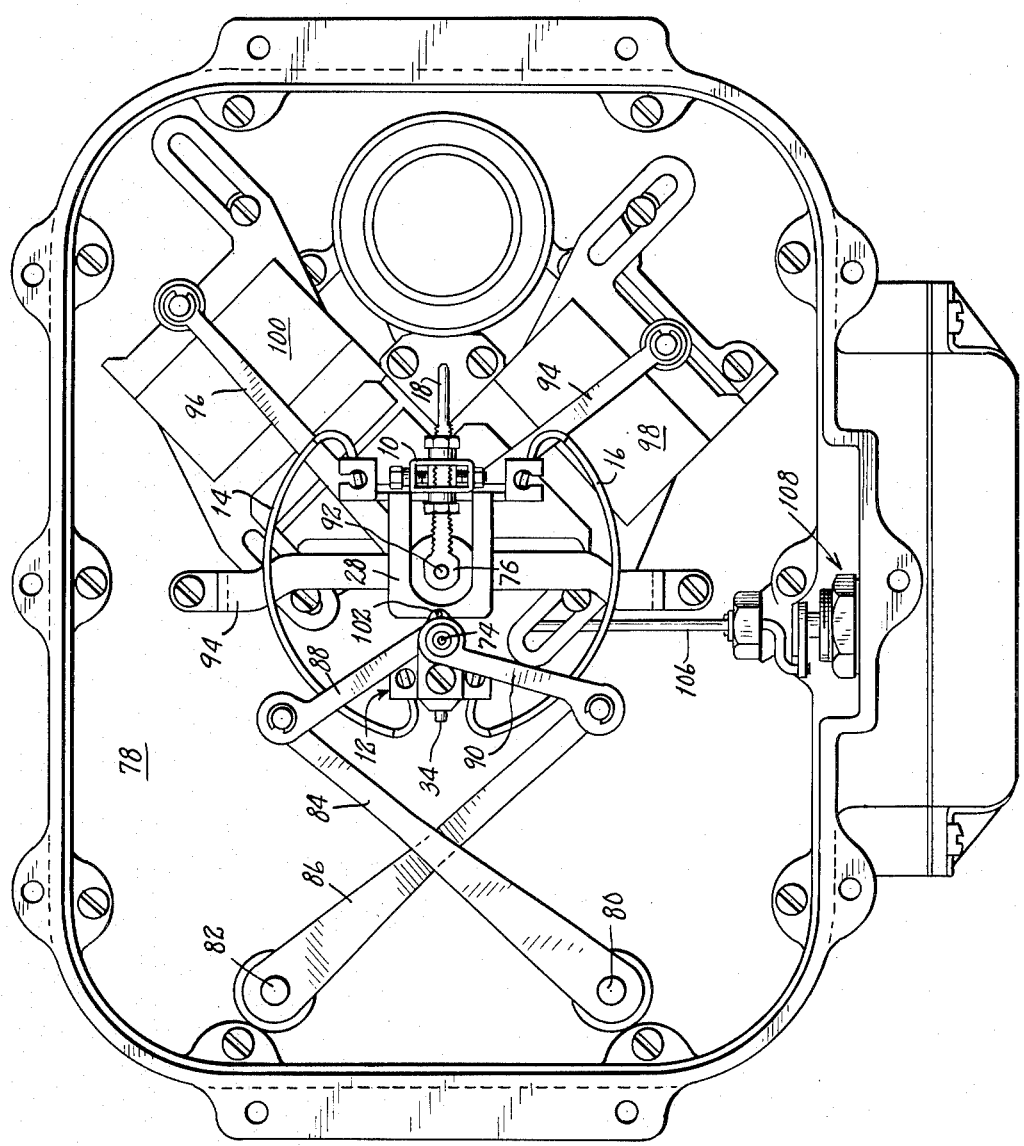
FIG. 3 is a plan view of a gas meter in which the compensating mechanism of FIG. 1 is installed, the meter cover being removed to show the underlying structure.

The compensating assembly is easily installed in a gas meter, as shown in FIG. 3; this figure being a plan view of a meter with the cover removed to show the mechanism which is ordinarily mounted on the table 78.

As well known in the art, gas meter operation depends on the use of a pair of diaphragms which alternately expand and contract as gas passes through the meter. The expansion and contraction of the diaphragms is converted to an oscillation of flags to which the diaphragms are attached, the flags extending upwardly through the table into the upper compartment of the meter where the oscillating movement is utilized to operate valve mechanism and an index which registers the amount of gas passing through the meter. Thus, is FIG. 3, a front flag 80 is connected to the wrist pin 74 of the tangent wrist assembly by means of flag arms 84 and 88, and a back flag 82 is connected to the wrist pin 74 by means of flag arms 86 and 90.

Figure 4:
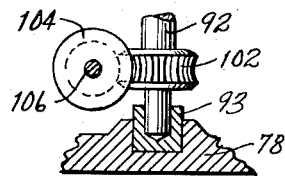
FIG. 4 is a detail showing a fragment of the crank shaft and its drive connection to an index shaft.

The motion of the flag arms is transmitted to a crank shaft 92 (FIG. 4). The crank shaft is journalled in a bearing 93 supported by the table 78 and extends upwardly through a crank frame 94 which is fixed to the table, and throughout the major portion of its length is spaced therefrom. The crank bearing 76 in the end of the tangent arm 18 is seated on the upper end of the crank shaft such that as the tangent wrist assembly is operated by the flag arms, the motion will be transmitted through the yoke 28 to the tangent arm and from the tangent arm to the crank shaft 92, whereby the crank is operated. The crank, in turn, operates crank arms 94 and 96 by which valve covers 98 and 100 are operated.

Since the compensating mechanism comprises a symmetrical structure, the bi-metal arms are balanced on both sides of the counting yoke 28, and their function as thermo-responsive elements is affected by temperature changes alone. No rivets, clamps, weldments, solder or lock nuts, which might cause hidden stresses, and which might interfere with the normal flexion of the arms are employed. The inherent flexion of the bi-metal arms alone determines the movement of the tangent wrist assembly.

The crank shaft 92 (FIG. 4) has attached thereto a worm gear 102 which is engaged with a gear 104 mounted on an index shaft 106. The index shaft 106 (FIG. 3) extends forwardly and operatively engages index mechanism 108 by which the amount of gas flowing through the meter is registered.

From the foregoing, it can be seen that the length of the stroke imparted by the tangent assembly varies as the bi-metal arms 14 and 16 expand and contract in response to temperature changes. This results in a modification of the swept volume of the diaphragms with the result that a greater or smaller volume of gas is permitted to flow through the meter to compensate for expansion and contraction in the volume of gas due to changes in temperature.

The adjustment of uncompensated meters for the delivery of a constant specified volume of gas at a predetermined temperature is a relatively simple process accomplished by adjusting the position of the tangent arm 18, either in an axial or in a lateral direction or both, by manipulating the clamping nuts 22 and 24, or by turning the adjusting screw 30. However, proof and adjustment of a compensating meter is a much more complicated process since errors existing in the meter mechanism on the one hand, and in the compensating mechanism on the other hand, may cancel each other with the result that the meter may prove within an accuracy tolerance when, in fact, substantial error exists. Furthermore, errors may be accumulative and the direction of the error may be difficult to detect.

The primary objective of the invention is attained herein by providing means in the compensating mechanism for fixing the mechanism at a predetermined calibration point. When so fixed, a meter can be proved as though it were an uncompensated meter and, in fact, it can be so used as an uncompensated meter.

Normally, meters are adjusted to compensate from a base temperature of 60° F., this being the temperature at which the utility buys the gase. After the compensator is assembled, as shown in FIG. 1, but before it is installed in the meter, it is brought to the base temperature desired by the purchaser (usually 60° F.) by holding it in a temperature controlled room. The point to which the tangent wrist assembly is moved, under the influence of the bi-metal arms 14 and 16, is then marked as the calibration point and suitable releasable means are provided to hold the tangent wrist assembly at that point. When so held, the mechanism will operate as a non-compensated tangent assembly.

Figure 7:
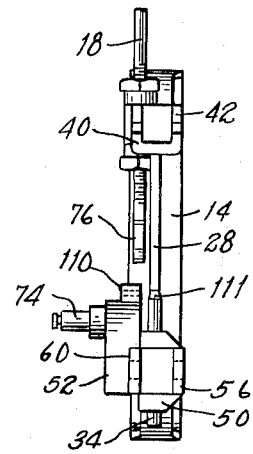
FIG. 7 is a side elevational view of the componsated tangent mechanism of FIG. 1; the bi-metal element at the near side having been removed to show underlying structure.

A convenient tangent wrist assembly lock for holding the same at the calibration point is provided by drilling a hole 110 (FIG. 7) through a flange 112 projecting forwardly from the cap member 52 of the tangent wrist assembly and into or through the underlying bight to form a registering hole 111 in the mounting yoke 28 when the mechanism is at its base temperature. Thereafter, the bi-metal arms 14 and 16 can be manually flexed until the hole 110 registers with the underlying hole 111 in the mounting yoke and if a pin 102 (FIG. 3) is now passed through these holes, the bi-metal arms 14 and 16 will be immobilized and the distance between the wrist pin 74 and the crank bearing 76 will be fixed. The mechanism will now operate as a non-compensated tangent assembly and may be used by consumers as such. Utilities awaiting approval of the use of compensated meters by Public Service Commissions may put meters in service with the pins in place. When approval is received, all that is necessary to convert the meter to a compensated one is to remove the hand hole cover in the meter case, remove the pin, and replace the hand hole cover. The compensating feature of the meter is thereby rendered operative.

One of the essentials of a temperature compensated meter is that it can be easily tested and calibrated, both for its function as a meter, and for its function as a compensating device. When a compensating meter is given a single proving for both functions at a given temperature, it is possible that multiple errors in the mechanism will cancel each other at that temperature and thereby produce an erroneous reading. Without the calibrating feature herein, the only way to be assured performance over a range of temperatures is to prove the meter at multiple temperatures, or to remove the compensating mechanism and test it and the meter independently. Both methods are costly and time consuming.

The accuracy of the compensated meter herein may be determined by proving the meter with the tangent wrist assembly locked at the calibration point by inserting the pin 102 through the hole 110 and into the registering hole 111 at the calibration point, and then proving it with the pin removed. Furthermore, the proof of meters, after a period of service, is also simplified. All the proving agency needs to do is to lock the compensating mechanism at the calibration point by inserting the locking pin and then prove the meter as a non-compensated meter.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a gas meter having a crank shaft adapted to operate valve mechanism, a tangent assembly having a tangent arm mounted therein for movement therewith, said tangent arm being engaged at one end thereof with said crank shaft for operating the same, a tangent wrist assembly, means connected to said tangent wrist assembly for moving the same in response to meter operation, tempertaure-responsive means interconnecting said tangent assembly and said tangent wrist assembly, said temperature-responsive means being effective to modify the distance between said tangent wrist assembly and said crank shaft in response to temperature changes, and means for optionally fixing said tangent wrist assembly at a predetermined distance from said end of said tangent arm whereby said temperature-responsive means is rendered unable to modify said distance between said tangent wrist assembly and said crank shaft.

2. The invention of claim 1 in which said temperature-responsive means comprises arcuate elements that are freely pivotable at their extremeties, respectively, in said tangent assembly and said wrist assembly.

3. The invention of claim 1 in which said temperature-responsive means comprises a pair of arcuate bi-metal elements symmetrically disposed about said crank shaft.

4. The invention of claim 1 in which said tangent assembly is mounted on a frame member, said frame member has a guide pin extending outwardly therefrom, and said tangent wrist assembly is mounted on said guide pin for reciprocating movement therealong under the influence of said temperature-responsive means.

5. The invention of claim 1 in which said tangent assembly is mounted on a frame member, and the means for fixing said tangent wrist assembly comprises means for fixing the same to said frame member.

6. The invention of claim 1 in which said tagnent assembly is fixed to a frame member, said predetermined distance is a point on said frame member, and said means for fixing said tangent wrist assembly comprises means for connecting a predetermined point on said tangent wrist assembly to said point on said frame assembly.

7. The invention of claim 1 in which said tangent assembly is mounted on a frame member, and said means for fixing said tangent wrist assembly comprises registering passages at predetermined points on said tangent wrist assembly and said frame member adapted to receive a locking pin by which said tangent wrist assembly is latched to said frame member.

8. Compensating mechanism for gas meters comprising a support, a tangent arm mounted on said support for movement therewith, a wrist assembly, and a pair of thermal-responsive members having opposite ends thereof freely pivoted, respectively, in said support and said wrist assembly, whereby said support and said wrist assembly are interconnected and said thermal-responsive members are adapted to move said wrist assembly in a linear direction toward and away from said tangent arm with changes in temperature.

9. Compensating mechanism for gas meters comprising a support having a bearing pin extending from one end thereof, a tangent arm mounted on said support, a wrist assembly mounted for sliding movement on said bearing pin, and a pair of thermal-responsive members having opposite ends thereof attached, respectively, to said support and said wrist assembly.

10. Compensating mechanism for gas meters comprising a support having a bearing pin extending from one end thereof, a tangent arm mounted on said support, a wrist assembly mounted for sliding movement on said bearing pin, and a pair of arcuate bi-metal thermal-responsive members having opposite ends thereof freely pivoted, respectively, in said support and said wrist assembly.

11. Compensating mechanism for gas meters comprising a support having a bearing pin extending from one end thereof, a tangent arm mounted on said support, said tangent arm having means in one end thereof for engaging a crank shaft, a wrist assembly mounted for sliding movement on said bearing pin, and a pair of oppositely curved thermal-responsive members having opposite ends thereof attached, respectively, to said support and said wrist assembly, said thermal-responsive members being symmetrically disposed about said tangent arm.

12. Compensating mechanism for gas meters comprising a support having a bearing pin extending from one end thereof, a tangent arm mounted on said support, said tangent arm having means in one end thereof for engaging a crank shaft, a wrist assembly mounted for sliding movement on said bearing pin, and a pair of oppositely curved bi-metal thermal-responsive members having opposite ends thereof freely pivoted, respectively, in said support and said wrist assembly, said thermal-responsive members being symmetrically disposed about said tangent arm.

References Cited in the file of this patent

UNITED STATES PATENTS

| | | |
|---|---|---|
| 2,339,956 | Sillers | Jan. 25, 1944 |
| 2,753,712 | Douglas | July 10, 1956 |
| 2,778,224 | Douglas | Jan. 22, 1957 |
| 2,912,859 | Douglas | Nov. 17, 1959 |